Sept 8, 1925.

T. H. OPPENHEIM ET AL 1,552,872

SNAPPING ROLLS FOR CORN HUSKING MACHINES

Filed Nov. 22, 1924

Inventor
T. H. Oppenheim
B. Selhorst

By Lacy & Lacy, Attorneys

Patented Sept. 8, 1925.

1,552,872

UNITED STATES PATENT OFFICE.

THEODORE H. OPPENHEIM AND BERNARD SELHORST, OF COLDWATER, OHIO, ASSIGNORS TO NEW IDEA SPREADER CO., OF COLDWATER, OHIO, A CORPORATION OF OHIO.

SNAPPING ROLLS FOR CORN-HUSKING MACHINES.

Application filed November 22, 1924. Serial No. 751,574.

*To all whom it may concern:*

Be it known that we, THEODORE H. OPPENHEIM and BERNARD SELHORST, citizens of the United States, residing at Coldwater, in the county of Mercer and State of Ohio, have invented certain new and useful Improvements in Snapping Rolls for Corn-Husking Machines, of which the following is a specification.

Our invention relates primarily to that class of corn-husking machines in which the corn stalks are delivered in bundles to sets of snapping rolls, by the action of which the ears of corn are snapped from the stalks, the ears then passing to husking rolls by the action of which the husks are stripped from the ears. The present invention relates more particularly to the construction of the snapping rolls and has for its object to provide rolls of such form that slipping of the stalks upon the rolls will be prevented.

Many forms of snapping rolls have been heretofore produced and have operated more or less satisfactorily, but with most of the rolls, when the butts of the stalks strike the center of the roll, they slip toward the upper end of the roll. Our present invention provides a structure whereby the sliding of the stalks along the roll is prevented, and it resides in certain novel features which will be hereinafter first fully described and then more particularly pointed out in the appended claims.

The invention is illustrated in the accompanying drawings, in which—

Figure 1:
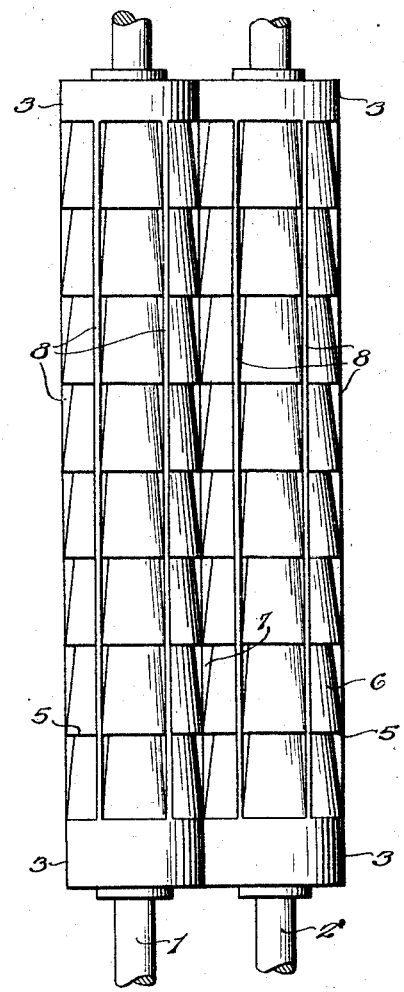
Figure 2:
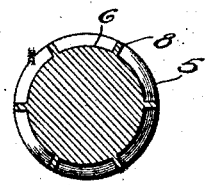

Figure 1 is an elevation of a pair of rolls embodying our present improvements, and Fig. 2 is a detail cross section of one of the rolls.

The rolls are arranged in pairs and are carried by parallel trunnions or shafts 1 and 2 which are caused to rotate through any suitable or preferred form of gearing. The shafts are disposed at such distance apart that the smooth surfaces 3 at the upper and lower ends of the rolls will normally ride upon each other, as clearly shown in Fig. 1 of the drawing, it being intended that the stalks shall be caught in the bight between the rolls and thereby directed so as to pass through the bight to bring the ears of corn into contact with the rolls whereby they will be snapped from the stalks.

In carrying out our present invention, we provide each roll with a series of annular ridges or shoulders 5 which are spaced equidistantly between the ends of the rolls, and the circumferential surface of the rolls, between successive shoulders or ridges, is tapered so as to define the frustum of a cone, as shown at 6. The rolls are so arranged that the shoulders or ridges 5 will ride together or upon each other at the bight between the rolls, and spaces 7 are thereby defined between the rolls which taper toward the lower ends of the rolls to permit the passage of the stalks but prevent the passage of the ears upon the stalks. With rolls of this configuration, when a stalk strikes either roll, it cannot slip an appreciable distance along the roll inasmuch as the ridge or ledge 5 immediately adjacent the point where the stalk strikes the roll will prevent such movement, and when the stalk enters the bight between the rolls the cooperating ledges or shoulders upon the two rolls provide an effectual stop to prevent the stalk moving longitudinally of the rolls.

The stalks frequently tend to slide circumferentially of the rolls, so that, instead of passing into the bight of the rolls, they will slide over the rolls to the outer sides thereof and will choke between the frame of the machine and the rolls. To overcome this tendency, we provide longitudinal breaker bars 8 which extend between the end surfaces 3 of the rolls and are spaced equidistantly around the rolls. These breaker bars may, if desired, project somewhat above the extreme height of the circumferential surface 6 of the rolls and they may be so arranged as to ride upon each other in the bight of the rolls or alternate in said bight, as may be preferred. The rotation of the rolls brings these breaker bars successively against the stalks which are fed to or may be resting upon the rolls so that they effectually direct and feed the stalks into the bight between the rolls.

From the foregoing description, it will be seen that we have provided an exceedingly simple construction of rolls whereby the ears will be effectually snapped from the stalks and the stalks are positively prevented from slipping along the rolls. At the same time the space between the rolls is restricted so that shelling of the corn is minimized. It will be noted that the tapered surfaces of the rolls have their bases in contact in the bight of the rolls and shelling of the corn cannot occur at this point of contact, while the space between the smaller ends of the mating sections is large enough to permit easy passage of the stalks but not large enough to cause excessive shelling. Our improved rolls, above described, positively feed the stalks into the bight between the rolls so that slipping of the stalks upon the rolls is positively prevented and the stalks easily enter the V-shaped pockets between the rolls. Our improved rolls do not mash the stalks and less power, therefore, is required to efficiently drive the rolls than was required with previously known rolls. While the rolls are designed primarily for use in husking machines, they may obviously be employed in corn pickers to snap the ears from standing stalks.

Having thus described the invention, we claim:

1. A pair of rolls for snapping ears of corn from corn stalks each roll having its circumferential surface provided with annular shoulders spaced equi-distantly from end to end of the roll and having tapered portions extending from shoulder to shoulder whereby stalks fed to the roll will be prevented by the shoulders from sliding along the rolls.

2. A pair of rolls for snapping ears of corn from stalks each having its circumferential surface provided with annular depressions, each of which gradually increases in depth toward one end of the roll, the greatest depth of one depression being in the same transverse plane of the roll as the minimum depth of the next adjacent depression.

3. A pair of rolls for snapping ears of corn from stalks each comprising frusto-conical sections extending from end to end of the roll with the peripheral edges of the bases of the sections on one roll opposed to and riding upon the peripheral edges of the respective sections on the other roll whereby the opposed meeting sections form triangular stalk receiving spaces between the rolls with the longitudinal axes of said spaces midway between the rolls.

4. A pair of rolls for snapping ears of corn from stalks each comprising a plurality of frusto-conical sections extending from end to end of the roll, and breaker bars extending longitudinally of the roll from end to end thereof over the surfaces of the frusto-conical sections, the taper of each section extending from end to end of the section and the combined length of all the sections being equal to the length of the breaker bar and constituting the effective length of the roll.

In testimony whereof we affix our signatures.

THEODORE H. OPPENHEIM. [L. S.]
BERNARD SELHORST. [L. S.]